United States Patent
Brideglall

(10) Patent No.: US 7,215,976 B2
(45) Date of Patent: *May 8, 2007

(54) RFID DEVICE, SYSTEM AND METHOD OF OPERATION INCLUDING A HYBRID BACKSCATTER-BASED RFID TAG PROTOCOL COMPATIBLE WITH RFID, BLUETOOTH AND/OR IEEE 802.11X INFRASTRUCTURE

(75) Inventor: Raj Brideglall, Mount Sinai, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 755 days.

This patent is subject to a terminal disclaimer.

(21) Appl. No.: 10/290,339

(22) Filed: Nov. 8, 2002

(65) Prior Publication Data

US 2003/0104848 A1 Jun. 5, 2003

Related U.S. Application Data

(60) Provisional application No. 60/340,742, filed on Nov. 30, 2001.

(51) Int. Cl.
*H04B 5/00* (2006.01)
*H04M 1/00* (2006.01)
*G08B 26/00* (2006.01)
*G06K 5/00* (2006.01)

(52) U.S. Cl. .................. 455/552.1; 455/41.1; 455/41.2; 455/41.3; 340/1.01; 340/505; 340/572.1; 235/383; 235/380; 235/492; 235/487

(58) Field of Classification Search ............... 455/41.1, 455/2, 3, 552.1, 553.1, 1.01; 340/1.01, 505, 340/572.1; 235/380, 492, 487, 383
See application file for complete search history.

(56) References Cited

U.S. PATENT DOCUMENTS 5,790,946 A * 8/1998 Rotzoll .................... 455/343.1
5,842,118 A * 11/1998 Wood, Jr. .................. 455/101

(Continued)

OTHER PUBLICATIONS

Raj Bridgelall, Characterization of Protocol-compatible Bluetooth/802.11 RFID Tags, Jul. 1, 2002, www.rfdesign.com.*

(Continued)

*Primary Examiner*—Matthew Anderson
*Assistant Examiner*—Yuwen Pan
(74) *Attorney, Agent, or Firm*—Baker Botts LLP

(57) ABSTRACT

An RFID system includes a hybrid backscatter-based RFID tag protocol-compatible with existing 802.11x/Bluetooth Standards as well as RFID standards. The tag is linked to a multi-protocol Interrogator via a generated RF Continuous Wave (CW) field. The tag includes an antenna coupled to an RFID and a Bluetooth/802.11x transceiver section. A Protocol Processor services RFID and transceiver sections and is coupled to the antenna via a backscatter switch. The Interrogator can switch the tag to an RFID backscatter radiation mode where the processor switches the antenna impedance to reflect the CW signal. For transceiver operation the processor switches antenna impedance in synchronization with a frame organized bit stream. For reception, the RFID section utilizes demodulation techniques, typically Amplitude Shift Keying (ASK), and provides a wake up mode within a predetermined distance of the Interrogator. The transceiver may operate in a backscatter or regular mode as directed by an Access Point.

34 Claims, 7 Drawing Sheets

U.S. PATENT DOCUMENTS

| | | | | |
|---|---|---|---|---|
| 6,078,251 | A | 6/2000 | Landt et al. | 340/10.41 |
| 6,269,342 | B1* | 7/2001 | Brick et al. | 705/20 |
| 6,317,028 | B1* | 11/2001 | Valiulis | 340/10.1 |
| 6,717,516 | B2* | 4/2004 | Bridgelall | 340/572.1 |
| 2002/0145045 | A1* | 10/2002 | Waxelbaum | 235/462.46 |
| 2003/0005060 | A1* | 1/2003 | Davidson et al. | 709/206 |

OTHER PUBLICATIONS

B.A. Miller et al., "Bluetooth Revealed", Prentice Hall PTR, Upper Saddle River, NY 07458 2001 (ISBN 0-13-090294-2); pp. 79-82 (2001).

M.S. Gast, "*The IEEE 802.11 Wireless Networks, The Definitive Guide*", O'Reilley and Assoc., Sebastopol, CA 95472 2002; pp. 173, 185-186 (2002).

Bob O'Hara et al, "*IEEE 802.11 Handbook, A Designer's Companion*", IEEE Press, New York, NY (ISBN 0-7381-1855-9) at pp. 45-46. (1999).

K. Finkenzeller, RFID Handbook, Radio-Frequency Identification Fundamentals and Applications, John Wiley & Son, Ltd., ISBN 0-41-98851-0, pp. 199-217 (1999).

* cited by examiner

RFID DEVICE, SYSTEM AND METHOD OF OPERATION INCLUDING A HYBRID BACKSCATTER-BASED RFID TAG PROTOCOL COMPATIBLE WITH RFID, BLUETOOTH AND/OR IEEE 802.11X INFRASTRUCTURE

PRIORITY CLAIM

This application claims the benefit of the filing date of Provisional Application Ser. No. 60/340,743, and filed Nov. 30, 2001, assigned to the same assignee as that of the present invention and fully incorporated herein by reference.

BACKGROUND OF THE INVENTION

1. Field of Invention

This invention relates to radio frequency communication devices, systems, and program products. More particularly, this invention relates to an RFID system including a hybrid BackScatter-based RFID tag, system and method of operation protocol compatible with Bluetooth and/or IEEE 802.11x infrastructure.

2. Description of Prior Art

The automatic identification and data capture (AIDC) industry has recently begun to aggressively evaluate active RFID tags for applications now requiring enhanced security and improved efficiency for tracking and locating high-value assets in real-time. Emerging high performance active tag products operate within the 2.4 GHz Industrial, Scientific, and Medical (ISM) band while their passive counterparts have been proposed for operation within disjointed UHF bands that have not yet been harmonized across the world. Nevertheless, we do expect that eventually, most high performance passive RFID tag technologies will operate in the UHF frequencies from 862 MHz to 928 MHz across Europe and North America. Conversely, we also expect that active tag technologies will seek to become protocol compatible with low cost communication system standards that currently operate within the worldwide unlicensed 2.45 GHz ISM band. The 2.4 GHz frequency band is available throughout most parts of the world for low cost short-range wireless communications and has increased in popularity with the proliferation of networking and cordless technologies based on IEEE 802.11x and Bluetooth. A growing number of RFID systems have also been designed for operation within the 2.4 GHz-ISM frequency bands. Doing so leverages design synergies with other ISM band products and provides infrastructure added value, and reducing overall deployment costs. As more wireless technologies seek to use the 2.4 GHz band, co-existence and protocol compatibility issues have become even more pronounced. What is needed in the AIDC industry is an RFID tag, system and method of operation and system protocol compatible with Bluetooth and IEEE 802.11x and incorporating features of a mobile device.

Prior art related to RFID systems and devices includes:

1. U.S. Pat. No. 6,337,634 entitled "Radio Frequency Data Communication Device", issued Jan. 8, 2002 describes a radio frequency identification device including an integrated circuit receiver, a transmitter, and a microprocessor. The receiver and transmitter together define an active transponder. The integrated circuit is preferably a monolithic single die integrated circuit including the receiver, the transmitter, and the microprocessor. The transmitter has a plurality of transmitting circuits, the plurality of transmitting circuits configured to selectively realize a plurality of modulated backscatter schemes. The integrated circuit is configured to receive and apply radio frequency signals via an antenna, the antenna and tunable circuitry cooperating in operation by switching the transmitting circuits with respect to the antenna to enable one of the transmitting circuits to realize one of the modulation schemes. Because the device includes an active transponder, instead of a transponder which relies on magnetic coupling for power, the device has a much greater range.

2. U.S. Pat. No. 5,790,946, entitled "Wakeup Device for Communication System", issued Aug. 4, 1998 describes a wake communication system including a first communication device for receiving data and a wake up signal. Operation of the first communication device includes an active mode of operation and a sleep mode of operation for reducing power consumption. Further, the system includes a switch for switching the first communication device to and from sleep mode in response to receiving the wake up signal. The system also includes a second communication device for transmitting data to the first device during its active mode, and for transmitting the wake up signal to the first device during its sleep mode.

3. U.S. Pat. No. 6,078,251, entitled "Integrated Multi-Meter and Wireless Communication Link", issued Jun. 20, 2000 describes an apparatus for object identification including a multi-meter terminal having a plurality of data modules, a triggering device for initiating one of the plurality of data modules to retrieve object identification data from an object. A radio module downloads the retrieved object identification data to a host and a housing contains the data modules, triggering device and the radio module. An RFID interrogator processes multiple tag protocols. The triggering device is responsive to a triggering signal from the host. The multi-meter terminal further includes a user interface and wherein the triggering device is responsive to a triggering signal initiated by the user through the user interface or generated by one of the plurality of data modules or generated manually by a user.

None of the prior art discloses an RFID system including a hybrid backscatter-based REID tag protocol compatible with low power communication systems using Bluetooth and/or IEEE 802.11x infrastructure.

SUMMARY OF INVENTION

A hybrid backscatter-based RFID tag is protocol-compatible with existing 802.11x and/or Bluetooth Standards, as well as RFID tag standards. The tag is linked to a multi-protocol interrogator via an interrogator generated RF Continuous Wave (CW) field. The tag comprises an RF-powered/wake up block and an 802.11x/Bluetooth transceiver block coupled to a protocol processor. Both blocks are serviced by separate antenna systems. The wake-up block is a passive circuit that accumulates energy on a capacitor and provides a threshold based wake-up signal to the processor. The wake-up signal is derived from a division of the capacitor voltage by a digital resistor. Once awakened, the processor activates a "listener" transistor which enables the processor to examine the RFID interrogator signal for RFID or transceiver operation. The "listener" transistor enables or disables both the wake-up block and an Amplitude Shift Keying (ASK) modulation/demodulation function. A regulator/charger block connected to the processor utilizes energy stored on the capacitor to trickle charge a battery whenever RF energy is present, such as each time the tag or a nearby tag is interrogated. The processor is coupled to the wake up block antenna via a backscatter switch, which allows the tag to operate in both passive and semi-passive modes. In operation, the interrogator supplies RF energy to the tag and ASK modulation to command the tag to operate in RFID or transceiver mode. If RFID mode is commanded and the battery is inoperative, the wake-up circuit rectifies the energy and stores it onto the capacitor to power up the tag for RFID operation in a passive mode using backscatter radiation. If the tag battery is operative, the interrogator is able to communicate with the tag in semi-passive RFID mode. The 802.11x/Bluetooth transceiver is activated at the intervals dictated by the sleep function incorporated into the protocol processor via the real-time clocks, or whenever an RFID interrogator asynchronously sends a command to activate the transceiver function before the wake-up interval is due. This can occur, for example, when the sleep intervals are set very long but the tagged item is taken through an RFID portal. Without this capability, the tag may not find a network to report its movement when it does awake. When the 802.11x/Bluetooth transceiver is activated, the processor serves as a host processor to manage the administrative and data transfer functions of the transceiver block. The interrogator can communicate with the tag via an access point in regular or backscatter radiation mode.

An aspect of the invention is a mode-determining apparatus in an RFID device, which examines an input signal characteristics from an interrogator to determine whether backscatter or low power communication protocol is required.

Another aspect is an RFID tag including a wake up block that accumulates energy on a capacitor which provides a threshold based wake up signal to a protocol processor where the wake up signal is derived from a division of the capacitor voltage by a digital resistor.

Another aspect is an RFID tag responsive to an interrogator for switching between backscatter modulation using amplitude shift keying and Bluetooth and/or 802.11x transceiver operation.

Another aspect is signal strength threshold apparatus in an RFID device for turning on a wake up apparatus when the device is within a pre-determined distance of a signal source.

Another aspect is signal examining apparatus in an RFID device examining the validity of received frames from an ASK demodulator to determine the required RFID communication protocol.

Another aspect is an RFID tag having an auxiliary sleep mode using a built in timer that keeps a real time clock enabling the transceiver section to be completely powered down while tracking the network timers and just before awakening powering up the transceivers permitting upload of the time-advanced network timers.

Another aspect is an RFID tag including a non-volatile memory which serves as a common repository for system data that can be communicated between RFID, WLAN, and WWAN networks.

Another aspect is a tag including a regulated charger block that utilizes energy stored in the tag to trickle charge a battery whenever RF energy is present, such as each time the tag or a nearby tag is interrogated.

Another aspect is disabling a wake-up block by turning off a "listener transistor" when RFID operation is not required or a transceiver block is operating.

DESCRIPTION OF THE DRAWING

These and other aspects of the invention will be further understood from the following detailed description of a preferred embodiment taken in conjunction with an appended drawing, in which.

DESCRIPTION OF PREFERRED EMBODIMENT

Figure 1:
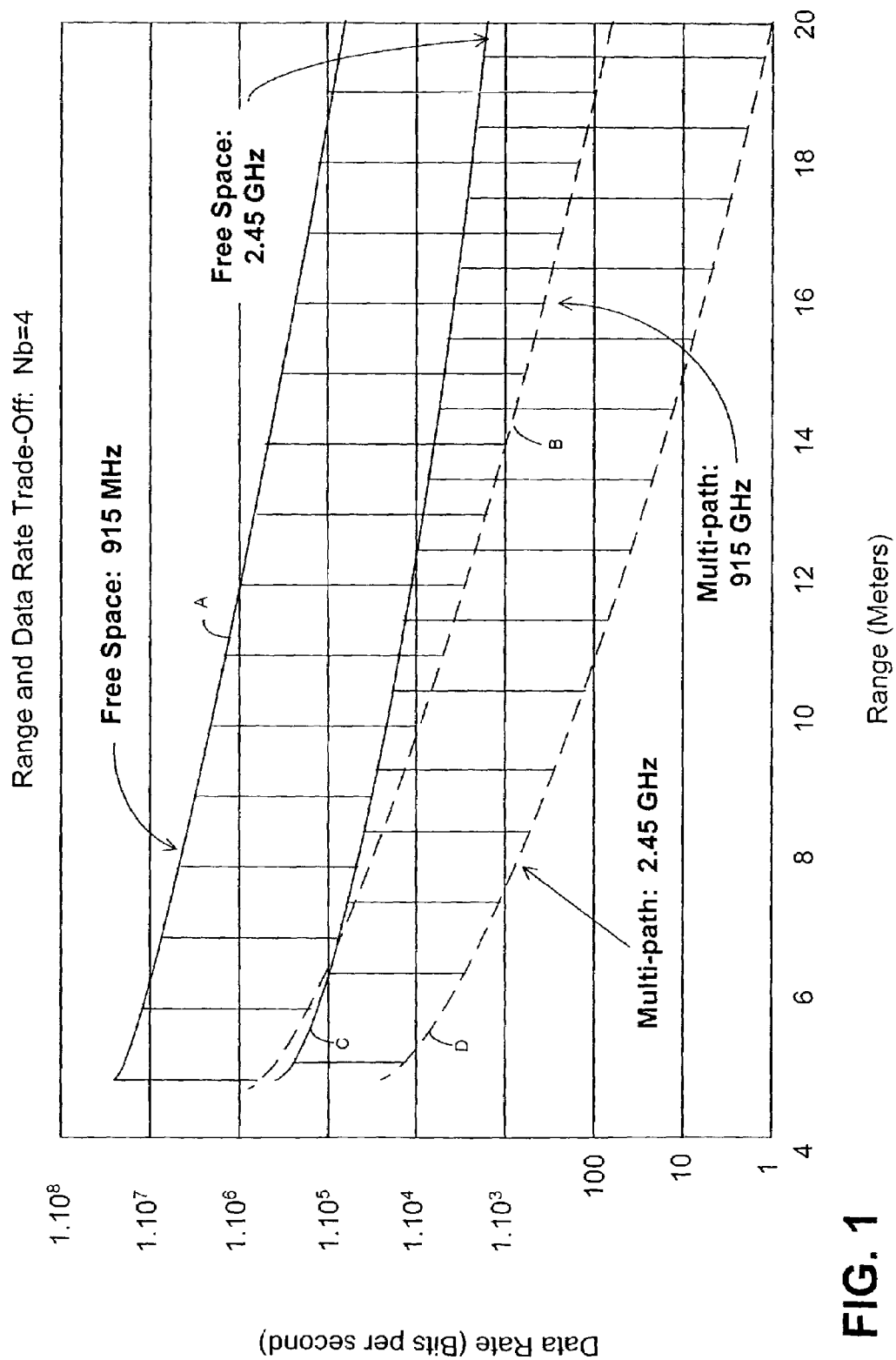
FIG. 1 is a graph of backscatter range and data rate trade-off in terms of data rate (bits per second) versus Range (meters) in free-space and multi-path conditions for 915 MHz and 2.45 GHz transmission.

A description of backscatter radiation characteristics is believed appropriate before describing the RFID system including an interrogator or reader and a hybrid backscatter-based RFID tag that can function in an RFID, 802.11x or a Bluetooth infrastructure.

When passive and active RFID tags transmit a signal via backscatter radiation, they modulate their antenna impedance in synchronization with a transmitted bit stream to reflect continuous wave (CW) energy from the base station or interrogator. BackScatter-based RFID tags do not independently radiate energy through power conversion from their local energy source. Backscatter radiation results in low modulation index, amplitude modulated (AM) signaling at the interrogator. The rate of change or the change of phase of this AM signal modulation typically encodes transmitted data on a frequency modulated (FM) or phase modulated (PM) sub-carrier respectively.

When reflecting a CW signal, the tag antenna characteristics are modified so the tag becomes mostly a poor collector of RF energy. For example, shorting the two terminals of a dipole or switching in an extra capacitor or inductor tap is a simple way of configuring the antenna as a poor collector or reflector. This has the effect of changing the antenna radiation efficiency, which in terms results in a change of its gain and matching efficiency.

For battery powered tags utilizing backscatter radiation, rather than active transmission (semi-passive tags), we expect the signal received by the base station will experience typical multi-path fading. We calculate the maximum data rate ($R_{bit}$) possible with non-coherent Amplitude Shifted Key (ASK) demodulation of backscatter radiation, as follows:

$$R_{bit}(r, p_e) = P_s \Psi_T^2 \Psi_r \left(\frac{\lambda}{4\pi r}\right)^4 X$$

$$\frac{1}{(1+r/R_0)^{2(N_B-2)}} \left(\frac{1}{k_B T_0 f_r}\right) \frac{1}{2\ln\left(\frac{1}{2p_e}\right)}$$

EQ. 1

Table 1 summarizes the parameters of Equation 1 and their values based on a typical backscatter RFID system design.

TABLE 1

Parameters for calculating the range and throughout of semi-passive tags

| | Value | Units | Definition |
|---|---|---|---|
| $P_s$ | 100 | Milli-Watts | CW power radiated by the interrogator. |
| $\lambda$ | | Meters | Wavelength of the RF carrier. |
| $\Psi_T$ | 1.475 | | The base station transmitter antenna realized gain. |
| $\psi_r$ | 1.426 | | The backscatter antenna reflectivity factor. |
| $R_0$ | 4 | Meters | Breakpoint distance when free-space path loss transitions to a higher loss index. |
| $N_B$ | 4 | | Multi-path propagation loss index typically observed in a cluttered warehouse. |
| $p_e$ | $10^{-6}$ | | Maximum acceptable probability of bit error (BER). |
| $T_0$ | 298 | Degrees Kelvin | Reference temperature for noise factor. |
| $k_B$ | $1.38 \times 10^{-23}$ | Joules/Kelvin | Boltzman's constant. |
| $f_r$ | 100 | | Receiver noise factor (derived from its noise figure specified in dBs). |

Equation 1 can be intuitively interpreted as follows:

(a) Bit rate ($R_{bit}$) is linearly proportional to realized or net power gain of both the transmitting ($\Psi_T$) and reflecting ($\psi_r$) antenna systems.

(b) Bit rate is inversely proportional to the signal propagation losses at a given distance based on the channel propagation ($R_0$, $N_b$) characteristics.

(c) Given a maximum desirable bit error probability ($p_e$), the bit rate is inversely proportional to the base station receiver noise factor ($f_r$) or equivalently its noise figure. Hence we can conclude that given no other changes, we can improve the bit rate or throughput of the communication system by the same factor that we can reduce the receiver noise figure. Therefore, we can achieve higher system throughput ($R_{bit}$) at a given desirable maximum operating distance r, maximum regulated output power ($P_s$), minimum realizable antenna system gain ($\Psi_T \psi_r$), and the maximum desirable bit error rate ($p_e$) simply by reducing the receiver noise figure ($f_r$). However, reducing a receiver's noise figure does come at the expense of higher burst power consumption. Likewise, we must also increase the base station receiver bandwidth in order to accommodate the higher modulation speed without degrading its noise figure. Doing so also implies increasing the receiver power consumption.

(d) The maximum possible bit rate for a given communication's distance r improves with the fourth power of the carrier wavelength $\lambda$. The implication here is that given the greater signal collection capability of antennas at lower frequencies, and barring interference, we can use more bandwidth in order to increase data rate without sacrificing bit error rate. Unfortunately, greater bandwidth is not always available within the lower frequency UHF bands, for example, compared with higher frequency microwave bands.

Given the same amount of information to transmit, an improvement in bit rate results in shorter packet transmission times. This means that the tag will access the airwaves less often and for shorter time slots. Additionally, shorter packets are statistically less susceptible to interference from other equipment utilizing the same frequency band, therefore resulting in fewer collisions and correspondingly, fewer requests for re-transmission. Hence, higher bit rate will result in a decrease in the average power consumption of the tag per information unit communicated since its transceiver will tend to utilize the airwaves less often.

FIG. 1 describes semi-passive backscatter performance in terms of Data Rate versus Range in meters for 915 MHz free space transmissions (A) with Multi-path (B) and 2.45 GHz free space transmissions (C) with multi-path (D). Given tag interrogators operating under reduced power transmission levels of 100 mW, which is identical to that of most 802.11x wireless LAN systems, we calculate the range and data rates for typical backscatter semi-passive tags from Eq. 1. The results in FIG. 1 show that within the 915 MHz UHF frequency band, and at a distance of about 10 meters from the base station, data rates between ten kilobits and one megabit per second are possible depending on the multi-path conditions and receiver sensitivity. In contrast, data rates between 200 bits per second and 30 kilobits per second are possible at ten meters when operating in a 2.45 GHz frequency band.

In order to match the data rates of the 802.11x and Bluetooth systems, the tags must operate within four meters of the transmitter. This has important implications for Bluetooth or 802.11x compliant RFID tags operating in the backscatter mode within the 2.45 GHz frequency band. For maximum throughput efficiency, these types of tags should be designed with adaptive rate scaling so that neither range nor data rates will be sacrificed when propagation conditions are favorable.

Since better receiver sensitivity and higher Signal-to-Noise Ratio (SNR) are possible with active transmission, we should expect orders of magnitude improvement in the range and throughput over backscatter based systems. However, we give up the low power consumption, and hence long battery life (or smaller, lighter, cheaper battery) characteristics that backscatter radiation would provide. Battery life is generally the most important feature amongst similar capability battery powered RFID tags.

Figure 2:
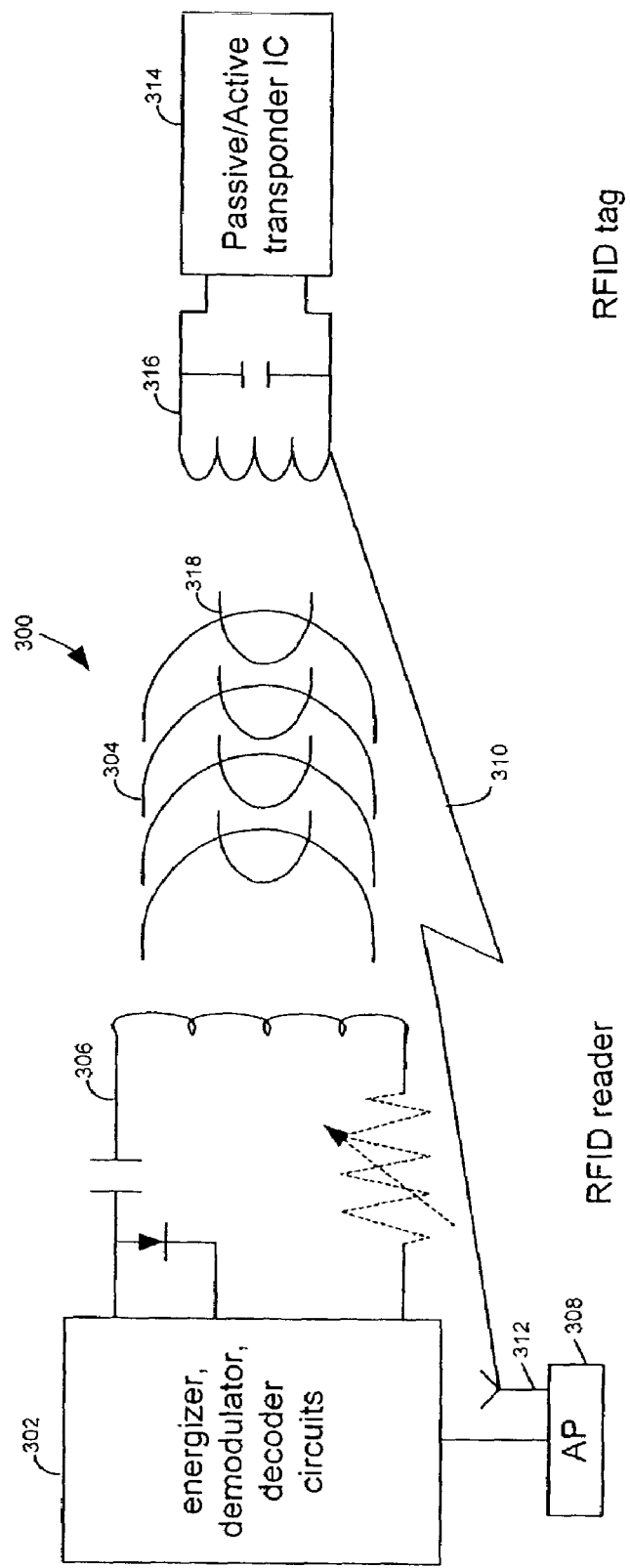
FIG. 2 is a representation of an RFID system including an interrogator or reader and an RFID device incorporating the principles of the present invention.

FIG. 2 shows a hybrid backscatter-based RFID Interrogator/Reader and RFID tag system 300 incorporating the principles of the present invention. The system protocol is compatible with RFID, Bluetooth and/or IEEE 802.11x infrastructures. A multi-protocol interrogator 302 energizes, demodulates and decodes Continuous Wave (CW) Radio Frequency (RF) signals 304 via a tuned circuit 306 operating in the 915 MHz or 2.45 GHz frequency bands. Interrogators or Readers are described in more detail in the text "*RFID Handbook: Radio Frequency Identification Fundamentals and Applications*" by K. Finkenzeller and R. Waddington, published by John Wiley & Sons, New York, N.Y. (IBN 0471988510) January 2000. The interrogator is coupled to an Access Point (AP) 308 for initiating and receiving Bluetooth or 802.11(b) transmissions 310 via an antenna 312 operating in the 2.45 GHz frequency range. Access Points are well known in the low power communication art, and need not be described herein. Both the interrogator and the AP are linked to a passive/active RFID tag 314 via a tuned antenna 316 adapted for backscatter radiation or tag generated transmissions 318.

Figure 3:
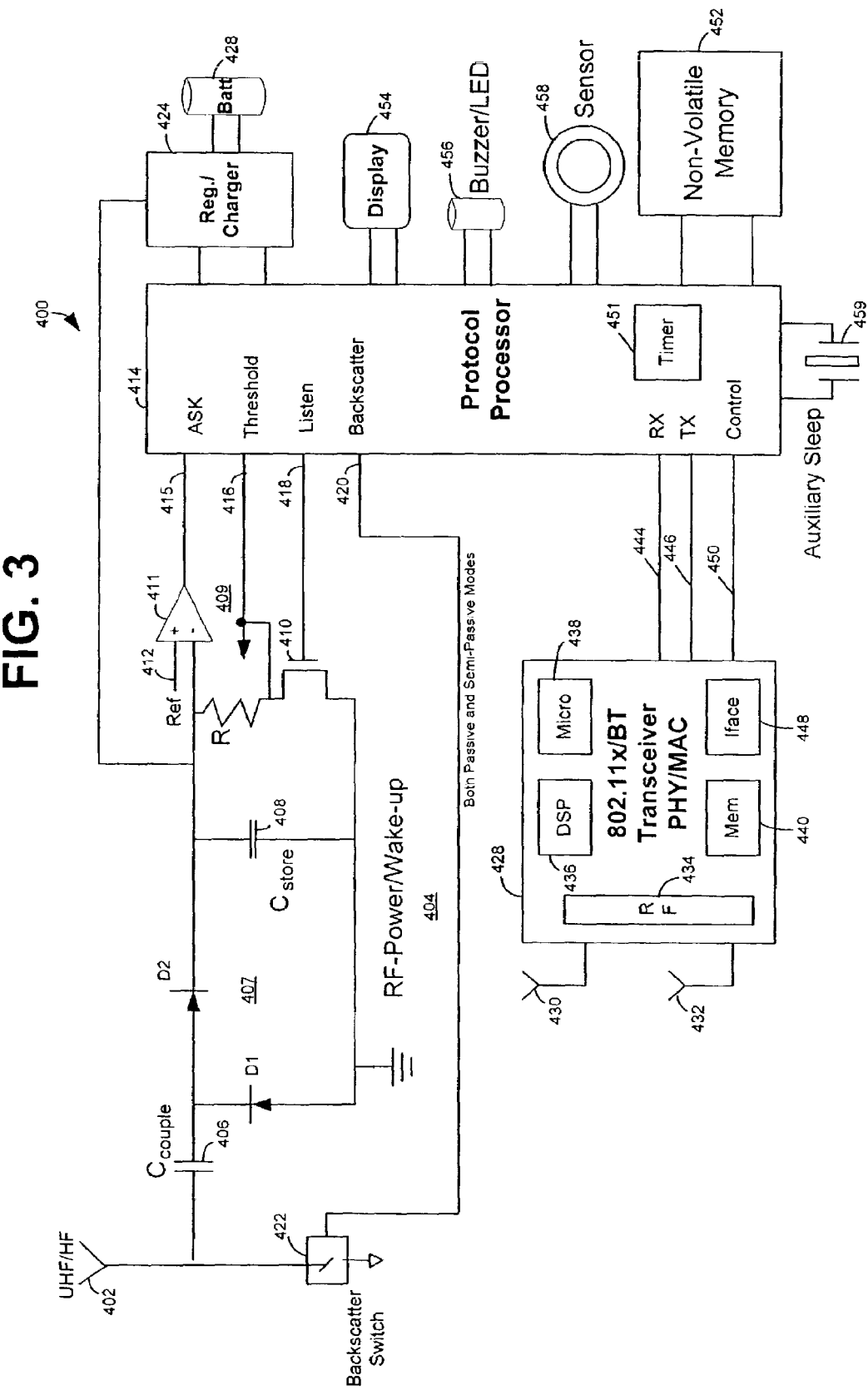
FIG. 3 is a representation of an active/passive RF tag protocol compatible with RFID, Bluetooth and IEEE 802.11x infrastructures in the system of FIG. 2.

FIG. 3 describes a semi-passive RFID tag design 400 that is protocol-compatible both with existing RFID tag standards like ISO18000-6 and other communication system standards like Bluetooth or IEEE 802.11x. Although a different radio front-end is required, this approach allows re-use of the same baseband, protocol, and host interface processor technology. Bluetooth and IEEE 802.11x protocol compatible RFID tags are obtained by retaining the frame structure and channel access mechanism plus adding the capability of backscatter radiation and ASK carrier modulation to the RF front end of the tag. By so doing, a tag is constructed with reasonable performance and low energy consumption.

In order to enhance power efficiency by significant amounts and greatly increase the tag's battery life, a multi-protocol interrogator can switch the tag to a backscatter radiation mode and emit CW energy in a frequency-hopping pattern when receiving a response. The tag may maintain protocol compatibility by switching the antenna impedance in synchronism with a Bluetooth/802.11x frame organized bit stream. For reception, the tag can utilize traditional demodulation techniques via the 802.11x/Bluetooth transceiver or it can also switch to a more power efficient and simpler ASK demodulation technique.

The hybrid Bluetooth 802.11x/active/passive RF tag 400 is fabricated in or on a substrate or member according to well-known processes and materials as described for example, in Ser. No. 10/014,448, filed Dec. 14, 2001, assigned to the same assignee as that of the present invention and fully incorporated herein by reference In one embodiment, the tag 314 includes an UHF/HF antenna 402 coupled to an RF-Power/Wake Up block 404. A capacitor 406 serves as a coupling device for a tuned circuit 407 including diodes D1, D2 and a storage capacitor 408. A threshold setting circuit 409 includes a variable digital resistor R connected across the tuned circuit via a listener switch 410, and to a protocol processor 414 via a threshold terminal 416 and a listen terminal 418. The resistor R is also connected to one end of a comparator 411, the other comparator end being connected to a reference potential 412. The comparator output is provided to the processor modulator/demodulator terminal 415 that looks for signal transitions in order to wake-up or Amplitude Shift Keyed signals to decode. The processor is coupled to the antenna 402 at a backscatter terminal 420 via a backscatter switch 422 for passive and semi-passive operational modes. A regulator/charger 424 and attached battery 426 are coupled to the processor and to the storage capacitor 408. The battery provides power to the processor for semi-passive or transceiver operation.

A transceiver block 428 includes an 802.11x transceiver serviced by an antenna 430 and a Bluetooth transceiver serviced by an antenna 432. Further details of the Bluetooth and 802.11x transceivers and accompanying protocols are described in the text "Bluetooth Revealed" by B. A. Miller et al., published by Prentice Hall PTR, Upper Saddle River, N.Y. 07458 2001 (ISBN 0-13-090294-2) and the text "802.11 Wireless Networks, the Definitive Guide" by M. S. Gast, published by O'Reilley and Assoc., Sebastopol, Calif. 95472 2002 which are fully incorporated herein by reference.

The transceiver block includes an RF section 434 linked to the transceivers and serviced by a digital signal processor 436 coupled to a microprocessor 438. A memory 440 services both the 802.11x and Bluetooth transceivers. The transceiver block is linked to the processor via a receive terminal 444, and a transmit terminal 446. An interface 448 is coupled to the processor via a control terminal 450. The processor serves as a host processor to manage the administrative and data transfer functions of the transceiver block via the control terminal 450. A built in timer 451 keeps a real time clock for tracking network timers while the transceiver are in a powered down state. The processor is connected to its own low frequency crystal to maintain accurate time while consuming less than 1 mW powered during the powered down mode.

A non-volatile memory 452 is coupled to the processor and serves both the wake up block 404 and the transceiver block 428. The shared non-volatile memory 452 stores the tag data and signal recovery programs processing the RF signals for detection of the tag mode of operation, i.e. RFID or transceiver mode. The memory also includes stored programs for implementing 802.11x and Bluetooth transmission with the access point 308 (see FIG. 2).

The separation of the RF-Power/Wake-up block 404 and the transceiver block 428 provides a network-bridging device. The shared non-volatile memory 452 serves as a common repository for system data that can be communicated between RFID, WLAN and WWAN networks. For example, the tag's IP address can be stored in the memory 452. The RFID interrogator 302 (see FIG. 2) with WWAN, WLAN, or wired-LAN connectivity serves as the network connection point for the tag at the time that it's being read. Therefore, this is useful in that it allows the interrogator having wide area network capability to proxy for the tag which does not have WWAN connectivity. For example, while the tag is traveling on a truck without WWAN connectivity, a portable or fixed station reader may activate the tag in the RFID mode, retrieve the IP address and communicate over WWAN (e.g. via satellite or cellular) to a network as the tag proxy. Once the desired data is downloaded the interrogator uploads the data to the tag via the local RFID link. Thus, the cost of adding WWAN capability to the tag is avoided but still achieves wide Internet connectivity when necessary. The wide area connectivity is separate from the tag zone small area network connection (WLAN or WPAN) via 802.11x or Bluetooth transceivers. As standards merge, new or updated RFID tag protocols can be automatically downloaded to the protocol processor and the non-volatile memory via the 802.11x or Bluetooth network interfaces.

The processor 414 is also coupled to a display 454 indicating the state of tag operation and also serving as an input device for the processor using a touch screen or incorporating a key entrance area. A buzzer/LED 456 may be included in the processor providing an indication when the tag is in an active state. A sensor 458 may be included in the tag to indicate whether RFID or transceiver signals are being received by the tag. The sensor may also provide environmental data such as temperature, pressure, and humidity. An auxiliary sleep battery 459 provides power to the processor when in a powered down state.

The wake up block 404 provides the tag with asynchronous wake up. That is, the tag can be completely powered down when not in use and awakened only when it comes within a predetermined distance of the interrogator. We can program this distance via setting signal strength thresholds through communication with the processor. While in a sleep state the wake up block accumulates energy on the capacitor 408 when sufficient RF energy is present from the interrogator. Because of the high quality factor of the receiver circuit 407 centered around select frequencies of the UHF or 2.45 GHz band, the capacitor develops sufficient energy to power up the voltage reference 412 and the comparator circuit 411 to provide a threshold based wake up signal to the processor. The wake up signal is derived from a division of the capacitor voltage by the digital resistor R. Once this derived signal exceeds the reference threshold 412, the comparator 411 will trigger a digital signal edge, which in turn interrupts the processor so that it can wake up. Once awake, the processor sets a digital resistor threshold value, that turns on the "listener" transistor 418 and recovers the interrogator AM modulated signal, thereby, immediately decoding a command if the impending RF signal is indeed from the RFID interrogator 302 (see FIG. 2).

The digital resistor has built in non-volatile memory that stores the last setting by the processor. There are two settings. The first setting establishes the wake up threshold. The second setting establishes a proper level for producing a clean ASK signal for decoding by the demodulator 415. Once awakened, the processor adjusts the digital resistor value through the ASK setting in order to decode the RFID interrogated signal. The processor may also adjust the digital resistor value adaptively over time as it learns a setting that provides the most error free data recovery.

The "listener" transistor enables or disables both the wake up threshold and ASK demodulation functions. The "listener" transistor also allows the processor to examine the RFID signal to determine whether RFID operational mode with or without backscatter or transceiver mode has been commanded by the interrogator. If the processor recognizes an RFID protocol, a response is transmitted in backscatter mode. Otherwise communication is referred to the 802.11x/Bluetooth transceiver for non-RFID mode. The 802.11x/Bluetooth transceivers determine whether or not to transmit in backscatter or active mode based on a capability bit or a flag that is set in the received 802.11x or Bluetooth frames. One of the users definable bits in any standard 802.11x or Bluetooth frame may be used for this feature.

The backscatter switch 422 allows the tag to operate in both passive or semi-passive modes. The tag may be operated in passive mode when the on board battery is depleted. The interrogator applies CW RF energy to the tag. The wake up circuit rectifies the energy and stores it onto the capacitor 408. The regulator/charger 424 is then able to supply stabilized power to the processor. The interrogator supplies ASK modulation to command the processor to switch to the RFID protocol mode. The tag responds by a backscatter modulation. If the battery is operative, the interrogator is able to communicate with the tag in semi-passive RFID mode from greater distances than when the tag is in the passive mode.

By separating the RFID wake up block and the transceiver block, the tag achieves power management by saving the 802.11x network timers onto the shared memory and using the sleep mode of a low power processor while completely powering down the 802.11x processor. The low power processor tracks the time and required 802.11x wake up intervals, and will trigger the 802.11x wake up.

Figure 4:
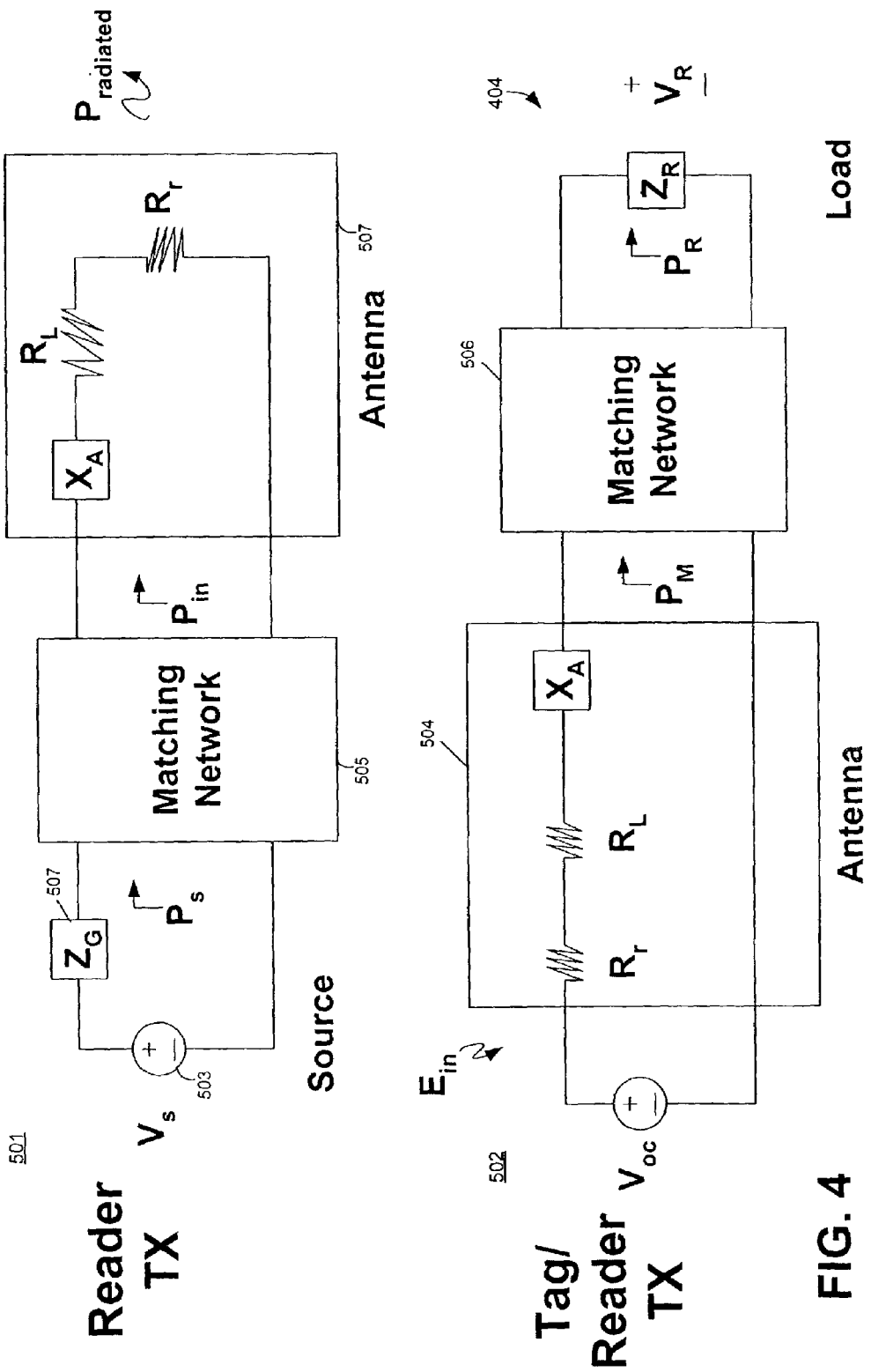
FIG. 4 is a representation of an Interrogator transmitting antenna and a Tag/Reader receiver antenna for use in the system of FIG. 2.

FIG. 4 discloses antenna models for RFID interrogator transceiver 501 and tag/reader receiver 502. In the transceiver 501, an RF voltage source ($V_s$) 503 serves as a power source ($P_s$) to a matching network 505, via characteristic impedance 507 of the source 503. The network 505 matches the signal source 503 and an antenna 507 impedance to reduce power loss. In one embodiment, the antenna 507 may be a looped antenna suitable for generating a magnetic field required to transfer energy to a battery less tag 314 (see FIG. 2). The loop antenna comprises a LC circuit 507. For a particular frequency, the inductive impedance $X_A$ is equal to the antenna capacitor impedance (not shown) and the antenna will be in resonance. The output power ($P_{IN}$) is provided over a load resistor $R_L$ with power loss $R_R$ due to antenna internal resistance.

The radiated power ($P_{radiated}$) is picked up by the tag/reader antenna 502 as an induced voltage ($V_{oc}$) subject to the antenna internal resistance ($R_r$), load resistance ($R_L$), and internal inductance ($X_A$). An antenna output power ($P_M$) is provided to a matching network 506 which provides a received power ($P_R$) at a voltage ($V_R$) to the tag represented by characteristic impedance ($Z_R$).

Figure 5:
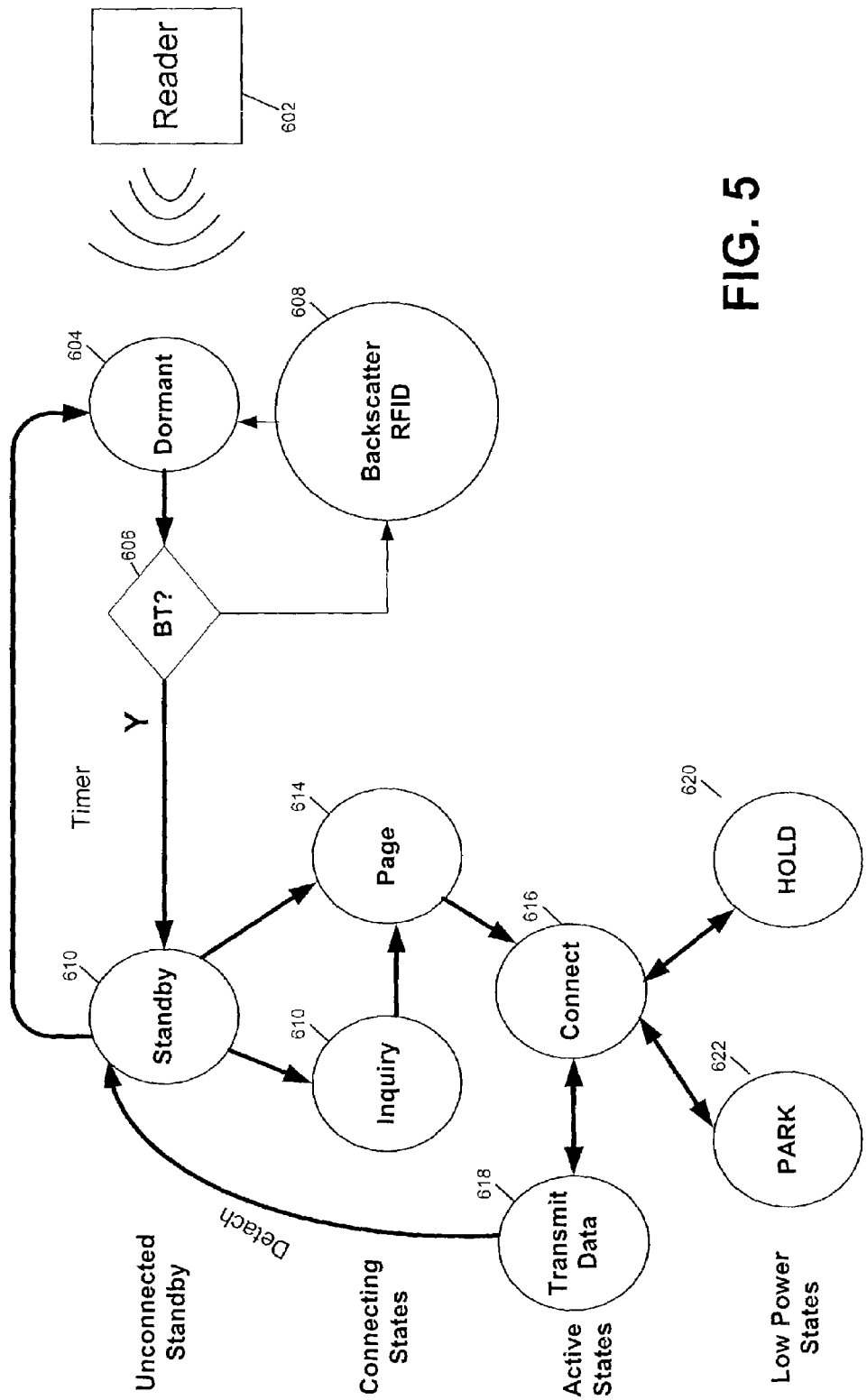
FIG. 5 is a state diagram for Bluetooth and backscatter RFID protocol compatibility in the system of FIG. 2.
Figure 6:
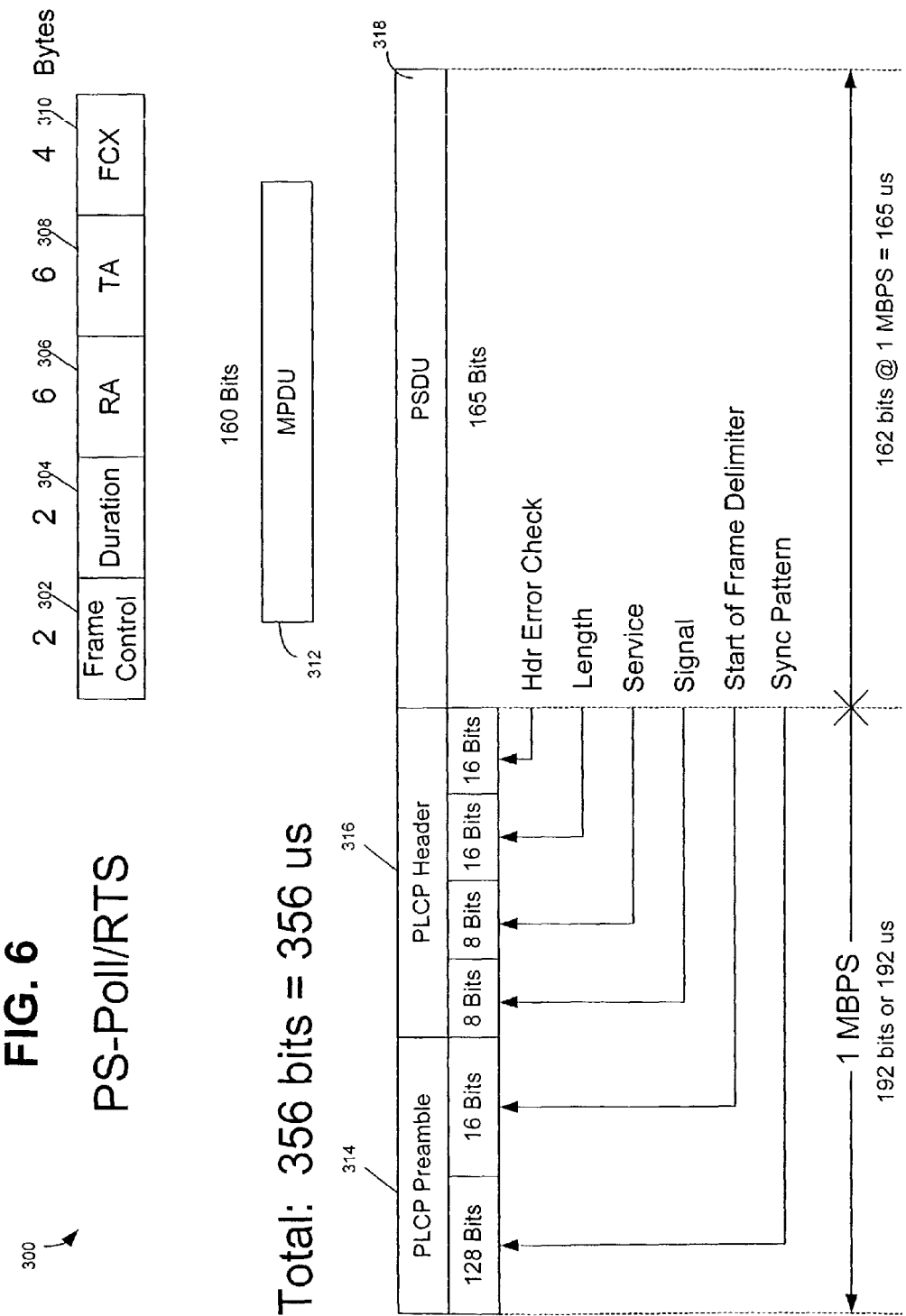
FIG. 6 is a representation of an 802.11(b) Request to Send (RTS) command or a Power Save (PS) Poll frame in the operation of the system of FIG. 5.

FIG. 5 describes the operation of the hybrid backscatter-based RFID interrogator in a tag reading process 600, described in conjunction with FIGS. 2 and 3. When the interrogator is ready to receive an RF tag, it may issue a RTS command to the nearby 802.11x access point or mobile device. As shown in FIG. 6, the RTS frame 700 is all header. No data is transmitted in the body and the frame check sequence (FCS) follows the header. The frame 700 includes a power save (PS)-poll portion including twenty bytes or 160 bits of which two bytes are for frame control through field 702. A duration field 704 of two bytes reserves a medium for an entire frame exchange. A receiver address field 706 of six bytes, is the address of the intended recipient of the frame. A transmitter address field 708 of six bytes provides the address of the sender of the frame. A frame check sequence field 710 of four bytes completes the frame. The RTS frame precedes a MAC protocol data unit 712 comprising a physical layer convergence procedure (PLCP) preamble 314; a physical layer convergence protocol header 360 and a PLCP service data unit 318. The function and operation of the MPDU 712 are described in the "*The IEEE 802.11 Wireless Networks, The Definitive Guide*", supra at pages 173, 185–186.

Figure 7:
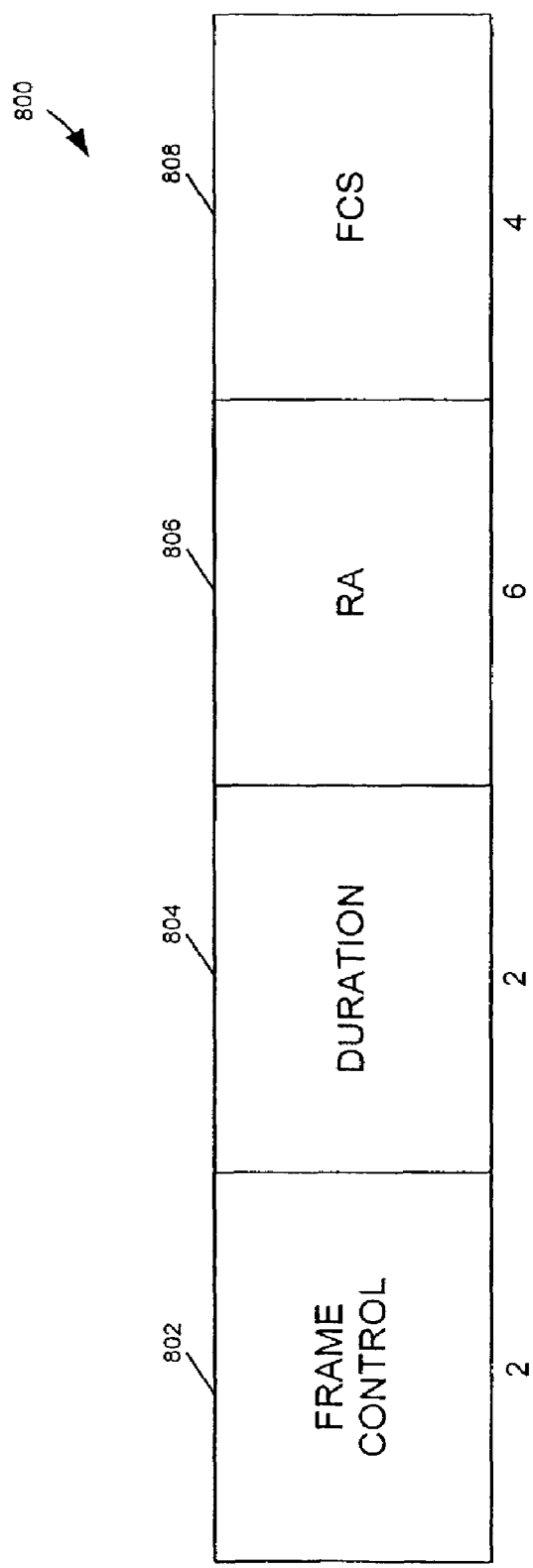
FIG. 7 is a representation of an 802.11(b) Clear To Send (CTS) command in the operation of the system of FIG. 5.

Returning to FIG. 5, once the Interrogator receives a clear to send (CTS) response all other 802.11x devices will refrain from using the channel for the requested time slot reservation by setting the appropriate time out on the network allocation vector (NAV) timer. The CTS frame 800 shown in FIG. 7 includes a frame control field 802 of 2 bits; a duration field 804 of 2 bits; a receiver address 806 of 6 bits identifying the individual MAC address to which the CTS is sent and a frame check sequence field 808 of 4 bits. Further details on the CTS frame are described in the text "*IEEE 802.11 Handbook*", by Bob O'Hara et al, published by IEEE Press, New York, N.Y. (ISBN 0-7381-1855-9) at pages 45, 46.

Continuing in FIG. 5, the interrogator commands the RFID tag into a communication mode that suits it best. For example, the interrogator may request the RFID tag to communicate via backscatter radiation using a simpler RFID communication frame format rather than the more complex 802.11x frame format so as to reduce power consumption. This flexibility in active transmission or backscatter radiation is useful in that any Bluetooth enabled device can communicate with the hybrid tag, as well as any traditional RFID Interrogator. Backscatter RFID tags cannot send unsolicited messages unless the Interrogator 602 establishes a CW RF field that can be reflected to its receiver. The multi-mode RFID Interrogator 602 negotiates with other communication devices in the area for collision-free time slots. The negotiation may be added through a common wire network connection to other access points (APs) or by emulating their RF signaling format.

The tag will determine which mode to utilize by the listener transistor 418 and processor 414 (see FIG. 3)

examining the interrogator signal transmission characteristics and the organization of the header sequence. Once the tag is awakened by the presence of a pre-determined intensity RF signal from the interrogator, the tag leaves its lowest power consumption or dormant state 604 and determines in a test 606 whether Bluetooth, for example, or traditional RFID protocol communication is required. The tag does so by examining the validity of the presently received frame from the Bluetooth and ASK demodulators. If the tag is within a pre-determined distance of the interrogator as set by the digital resistor R (See FIG. 3), the tag will enter the traditional RFID communication mode and will temporarily shut down the Bluetooth transceiver before proceeding with normal backscatter RFID communications in block 608. Otherwise, standard Bluetooth communications may commence in either the backscatter radiation or active transmission mode. In the former state, the processor 414 (FIG. 3) turns on the switch 452 to disconnect the transceiver section 428 and transmit the tag data stored in the memory 414. In one embodiment, the processor modifies the characteristics of the antenna 402 by shorting the terminals of the dipole or switching in an extra capacitor or inductor, in accordance with a data stream providing the stored tag information. The RFID interrogator returns to a sleep mode when the tag completes the data transfer mode and/or moves outside the range of the interrogator.

If the Bluetooth/802.11x mode is detected in block 606 by the listener transistor 418 and processor 414 (FIG. 3), the processor powers on the transceiver 428, sets the timer 451 for the network allocation vector and determines whether or not to transmit in the backscatter or Bluetooth mode based on a capability bit or flag that is set in the Bluetooth frame. Bluetooth frames are described in the text "*Bluetooth—Connect Without Cables*", by J. Bray et al, Second Edition, Prentice Hall PTR Upper Saddle River, N.J. 07458 (ISBN 0-13-066106-6), published 2002 at pages 180–185 which is incorporated herein by reference.

After activation, the transceiver 428 enters a standby mode in block 610. In this state, the device is inactive, no data is being transferred and the radio is not switched on. Thus, the transceiver is unable to detect any access code.

The transceiver proceeds to an inquiry state in block 612 and an attempt is made to discover the Access Point 308 (FIG. 2) using the Service Discovery Protocol (SDP). During the inquiry process, the Access Point will supply frequency hop synchronization packets needed to allow the transceiver section 428 to synchronize with the hop sequence of the Access Point 308. To establish a connection, the transceiver 428 enters a paging state in block 614. In the paging state, the transceiver transmits paging messages directed at the Access Point which acknowledges the paging message as a slave and the transceiver enters the master response state responding with its Frequency Hopping Sequence (FHS) packet. If the inquiry or paging states are not entered, the transceiver returns to the dormant state, after a timed interval.

The transceiver enters into a connection state 616 and switches to the receiver's clock by applying a relevant offset to its own clock. The Access point moves on to the transceiver frequency hop and timing sequence. During the connection state, various data exchanges can be used to transmit data to the Interrogator via the Access Point in block 618. The transceiver keeps transmitting periodically, even if there is no data to send. Also, the transceiver may move into a low power state and return to the standby block 610. When the network allocation vector timer 451 (See FIG. 3) expires, the protocol processor returns the transceiver 428 to the powered-off state.

While in the connection state 616, the transceiver may enter into a hold or park state. A hold state in block 620 causes the transceiver to terminate support for asynchronous connectionless traffic for a defined period of time thereby to free up bandwidth for other operations, such as standing, paging, inquiry or low power slave. After the old time has expired, the transceiver synchronizes to the channel access code and commences to listen for Interrogator traffic.

A park mode 622 is entered when the interrogator gives up its active member address and listens to traffic only occasionally. The transceiver is able to enter a low-power sleep mode. Further details of various Bluetooth transceiver states are described in the text "*Bluetooth Connect Without Cables*", by J. Bray et al, published by Prentice Hall PTR, Upper Saddle River, N.J. (ISBN 0-13-066106-6) at pages 67–70.

While the invention has been shown and described in a preferred embodiment, various changes can be made without departing from the spirit and scope of the invention, as defined in the appended claims, in which:

I claim:

1. An RFID communications device comprising:
   a) a substrate;
   b) a first antenna disposed on the substrate and coupled to a low power communication transceiver responsive to low power communication protocols;
   c) an RFID transceiver coupled to a second antenna and implementing ASK demodulation of signals received at the antenna;
   d) a processor coupled to the low power transceiver and the RFID transceiver;
   e) switching apparatus which switches the device between a backscatter mode of operation and a low power communication mode of operation in response to an input signal; and
   f) a wake-up apparatus in the RFID transceiver, the apparatus powering down the device when not in use and turning on the device when within a pre-determined distance of an RF signal source.

2. The RFID device of claim 1 further comprising;
   g) signal strength threshold apparatus included for turning on the wake up apparatus when within the pre-determined distance of the RF signal source.

3. The RFID device of claim 2 further comprising:
   h) a programmable digital resistor included in the signal strength threshold apparatus for implementing a threshold to turn on the processor.

4. The RFID device of claim 1 further comprising:
   i) mode-determining apparatus which examines the input signal characteristics to determine whether backscatter or low power communication protocol is required.

5. The RFID device of claim 1 further comprising:
   j) powering off apparatus which turns off the low power communication transceiver when proceeding with backscatter based RFID communication.

6. The RFID device of claim 1 further comprising:
   k) signal examining apparatus which examines the validity of received frames from the RFID transceiver and an ASK demodulator to determine the required RFID communication protocol.

7. The RFID device of claim 1 further comprising:
   i) modulating apparatus which modulates the second antenna impedance to reflect Continuous Wave (CW) energy from a base station or interrogator.

8. The RFID device of claim 1 further comprising:
(m) a power supply coupled to the processor for operation of the device in an active mode.

9. The RFID device of claim 1 further comprising:
(n) connecting apparatus which connects the switching apparatus to the second antenna and to the processor.

10. The RFID device of claim 1 wherein the low power communication is Bluetooth and/or IEEE 802.11x.

11. An RFID communication system comprising:
(a) a multi-protocol interrogator generating an RF continuous wave (CW) field;
(b) an RFID tag linked to the interrogator by the CW field; and
(c) means included in the RFID tag responsive to the interrogator for switching between backscatter modulation using amplitude shift keying and Bluetooth and/or 802.11x transceiver operation.

12. The communication system of claim 11 further comprising:
(d) interrogator apparatus which enables the interrogator to negotiate for collision-free time slots from other transmitters in the system area.

13. The communication system of claim 11 further comprising:
(e) RF field generating apparatus which generates a CW field reflected by the RFID tag device.

14. The communication system of claim 11 further comprising
(f) command generating apparatus which generates a command commanding the RFID tag to select a preferred communication protocol for communicating with the interrogator.

15. An RFID communication system having wide area network capability, comprising:
(a) an RFID transceiver coupled to a first antenna and a processor in an RFID tag;
(b) a low power communication system in the RFID tag separated from the RFID receiver, the system coupled to a low power communication antenna and to the processor;
(c) a memory coupled to the processor for storing network element of the RFID receiver and low power communication sections; and
(d) means to activate the RFID transceiver, retrieve an IP address of the RFID tag and transfer data to the RFID tag from a wide area network or vice versa.

16. An RFID communication system having low power characteristics, comprising
(a) an RFID transceiver coupled to an antenna and a processor in an RFID tag, the RFID transceiver adapted for sleep mode operation;
(b) a low power communication system in the RFID tag separated from the RFID transceiver, the low power communication system coupled to a low power communication antenna and to the processor;
(c) a memory coupled to the processor for storing timer information of the low power communication system; and
(d) means for powering down the low power communicator section and utilizing the sleep mode condition of the RFID receiver, when awakened, to trigger the low power communication system for operation.

17. A method of communication in an RFID communication system, comprising:
(a) generating an RF continuous wave (CW) field by a multi-protocol interrogator;
(b) coupling a hybrid backscatter based RFID tag to the interrogator by the CW field, the tag including RFID signaling and low power communication;
(c) switching the RFID tag between the RFID signaling and the low power communication; and
(d) selecting backscatter radiation for the RFID signaling or the low power communication.

18. The method of communication of claim 17 further comprising:
(e) powering down the low power communication and utilizing a sleep mode for the RFID, when awakened, to trigger the operation of the low power communication.

19. The method of communication of claim 17 further comprising:
(f) storing network elements related to the RFID signaling and low power communication;
(g) activating the RFID signaling and retrieving an IP address of the RFID tag; and
(h) transferring data to the RFID tag from a wide area network or vice versa.

20. An RFID communication system, comprising:
(a) an RFID tag including an RFID transceiver and a low power communication transceiver;
(b) a processor coupled to the transceivers;
(c) a multi-protocol interrogator linked to the RFID tag;
(d) switching means responsive to the RFID transceiver to enable operation of the RFID transceiver in passive and semi-passive modes.

21. The RFID communication system of claim 20 further comprising:
(e) mode-determining apparatus in an RFID tag which examines an input signal characteristics from the interrogator to determine whether backscatter or low power communication protocol is required.

22. The RFID communication system of claim 20 further comprising:
(f) wake up apparatus that accumulates energy on a capacitor which provides a threshold based wake up signal to the processor where the wake up signal is derived from a division of the capacitor voltage by a digital resistor.

23. The RFID communication system of claim 22 further comprising:
(g) signal strength threshold apparatus in the tag for turning on the wake up apparatus when the tag is within a pre-determined distance of a signal source.

24. The RFID communication system of claim 20 further comprising
(h) signal examining apparatus in the tag examining the validity of received frames from an ASK demodulator to determine the required RFID communication protocol.

25. The RFID communication system of claim 20 further comprising
(i) auxiliary sleep mode apparatus including a built-in timer that keeps a real-time clock enabling the low power transceiver to be completely powered down while tracking network timers and just before awakening powering up the low power transceiver permitting upload of time-advanced network timers.

26. The RFID communication system of claim 20 further comprising
(j) a non-volatile memory which serves as a common repository for system data that can be communicated between RFID, WLAN, and WWAN networks.

27. The RFID communication system of claim 20 further comprising:
  (k) a regulated charger block connected to the processor and utilizing energy stored in the tag to trickle charge a battery each time the tag or a nearby tag is interrogated.

28. The RFID communication system of claim 22 wherein the wake up apparatus is disabled by turning off a "listener" transistor when RFID operation is not required or a low power transceiver is operating.

29. A method of operating an RFID communication system, comprising:
  (a) receiving an RF signal from a multi-protocol interrogator in an RFID tag;
  (b) examining the signal to determine RFID or low power communication for the RFID tag;
  (c) initiating operation of the RFID tag in a backscatter radiation mode if RFID operation is identified in the signal;
  (d) initiating operation of the RFID tag in a low power communication mode if identified in the signal;
  (e) activating an inquiry mode for a transceiver when the tag is in the low power communication mode;
  (f) conducting a paging operation for the transceiver to connect with an access point; and transferring data from the RFID tag to the access point for delivery to the interrogator.

30. The method of claim 29 further comprising:
  (g) storing data and WWAN network information in the RFID tag; and exchanging data with the WWAN network via the access point and the interrogator when the RFID tag is in the low power communication mode.

31. In an RFID tag including an RF transceiver and a low power communication transceiver coupled to a processor, a method of low power operation, comprising:
  (a) operating the tag in a sleep state with the RF transceiver, low power communication transceiver and the processor in a powered down state;
  (b) receiving an RF signal and storing RF energy in a storage device;
  (c) providing a threshold based wake-up signal to the processor when sufficient energy is stored in the storage device;
  (d) triggering the processor to wake up in response to the threshold based wakeup signal;
  (e) examining the RF signal to determine tag operation whether in an RF transceiver or a low power communication transceiver mode of operation;
  (f) enabling the RF transceiver and the low power communication transceiver to respond to a determined mode of operation; and
  (g) powering down the RF transceiver, the low power communication transceiver and the processor after completion of the determined mode of operation.

32. The method of claim 31 further comprising:
  (h) tracking network timers in a local timing device;
  (i) powering up the low power communication transceiver according to required network wake-up intervals tracked by the local timing device.

33. The method of claim 31 further comprising:
  (j) determining whether RF transceiver mode of operation is with or without backscatter radiation.

34. The method of claim 31 further comprising:
  (k) determining whether low power communication transceiver operation is with or without backscatter radiation.

* * * * *